United States Patent [19]

Haigh

[11] 4,145,886

[45] Mar. 27, 1979

[54] TANK SUPPLY FAIL SAFE

[75] Inventor: Robert Haigh, Northboro, Mass.

[73] Assignee: Johnson & Bassett, Inc., Worcester, Mass.

[21] Appl. No.: 805,913

[22] Filed: Jun. 13, 1977

[51] Int. Cl.² ............................................. B60T 13/00
[52] U.S. Cl. ..................... 60/547 R; 60/406; 60/413; 60/593; 91/5; 91/33
[58] Field of Search ................ 60/547, 582, 585, 593, 60/403, 404, 405, 406, 563, 569, 413; 91/5, 33, 420; 137/102; 303/2, 9

[56] References Cited

U.S. PATENT DOCUMENTS

| 3,176,467 | 4/1965 | Van House | 60/569 |
| 3,348,378 | 10/1967 | Lemley | 91/5 |
| 3,677,007 | 7/1972 | Goscenski | 60/582 |

FOREIGN PATENT DOCUMENTS

| 2318916 | 10/1974 | Fed. Rep. of Germany | 60/413 |
| 1283776 | 3/1961 | France | 91/33 |

Primary Examiner—Martin P. Schwadron
Assistant Examiner—Abraham Hershkovitz
Attorney, Agent, or Firm—Charles R. Fay

[57] ABSTRACT

A sealed tank normally receiving air under pressure is connected with respect to a shuttle valve so that when there is an accidental loss of pressure, the air in the tank moves the valve to a position where the high pressure in the tank is applied to an intensifier piston placing a brake or the like in operation. By using a three-way valve in the main supply line the brake may be cycled at will merely by an appropriate turn of the valve.

5 Claims, 2 Drawing Figures

TANK SUPPLY FAIL SAFE

BACKGROUND OF THE INVENTION

Most fail safe brakes are actuated by heavy mechanical springs, such as powerful compression springs or stacked Belville washers. These springs bear against a piston, holding frictional material against the rotative member of the brake to provide the stopping or holding torque to hold the brake in the on position. High hydraulic pressure is used on the front of the piston to force it back against the spring force to keep the brake released. There are disadvantages to this system.

For example, an external high pressure hydraulic source must be provided and applied to the brake. Adjusting the brake and pressures in some cases means disassembly of the unit to change the stack of Belville washers or changing the compression spring for a higher or lower spring force. Wear of the frictional material changes the compression height of the springs, resulting in reduced braking forces; and in some cases a manual screw adjuster must be used to maintain the spring force. Also, releasing this type of brake where there is no hydraulic pressure available in a brake-down situation usually means having to use some external mechanical force to compress the spring.

It is the object of the present invention to provide a novel fail safe unit not dependent on external hydraulics or force springs, and wherein only low pressure air is required; and simply by the use of a three way valve, the brake can be applied or retracted at any time desired; braking torques can be varied simply by regulating the input air pressure; the fail safe pressures are not greatly affected by frictional material wear; and breakdown brake release is achieved by releasing tank pressure by means of a relief valve without further mechanism or action required.

SUMMARY OF THE INVENTION

In the present case a brake (or other mechanism) is normally kept released by a low pressure line sixty to one hundred PSI using air where the pressure is continually applied through a shuttle (piston) valve which at the same time continually maintains a separate sealed tank under pressure. As long as the system is desired to be released, the intensifier is kept in its retracted position and the tank is kept energized through the normal air line.

However, should the air fail, the valve is shifted by the air under pressure in the tank and its supply is cut off so that it cannot evacuate. Upon shifting of the valve the air pressure in the tank is transferred to the opposite side of the intensifier piston from that normally impinged upon by the normal air pressure line, thereby moving the intensifier piston to a point applying hydraulic pressure to the brake or other mechanical device which is desired to be actuated.

Through the use of this system, it is only necessary to apply a three-way valve to the supply line to cycle the brake, i.e. the brake can be turned on and off instantaneously as often as may be desired. As long as the pressure line is operating, the tank is maintained under its pressure, and when the line pressure is cut off for any reason or fails, the supply from the tank is also cut off so that it cannot lose its pressure reversely.

The entire system is completely internal and the only thing necessary is the supply line for the sixty to one hundred PSI air pressure.

Figure 1:
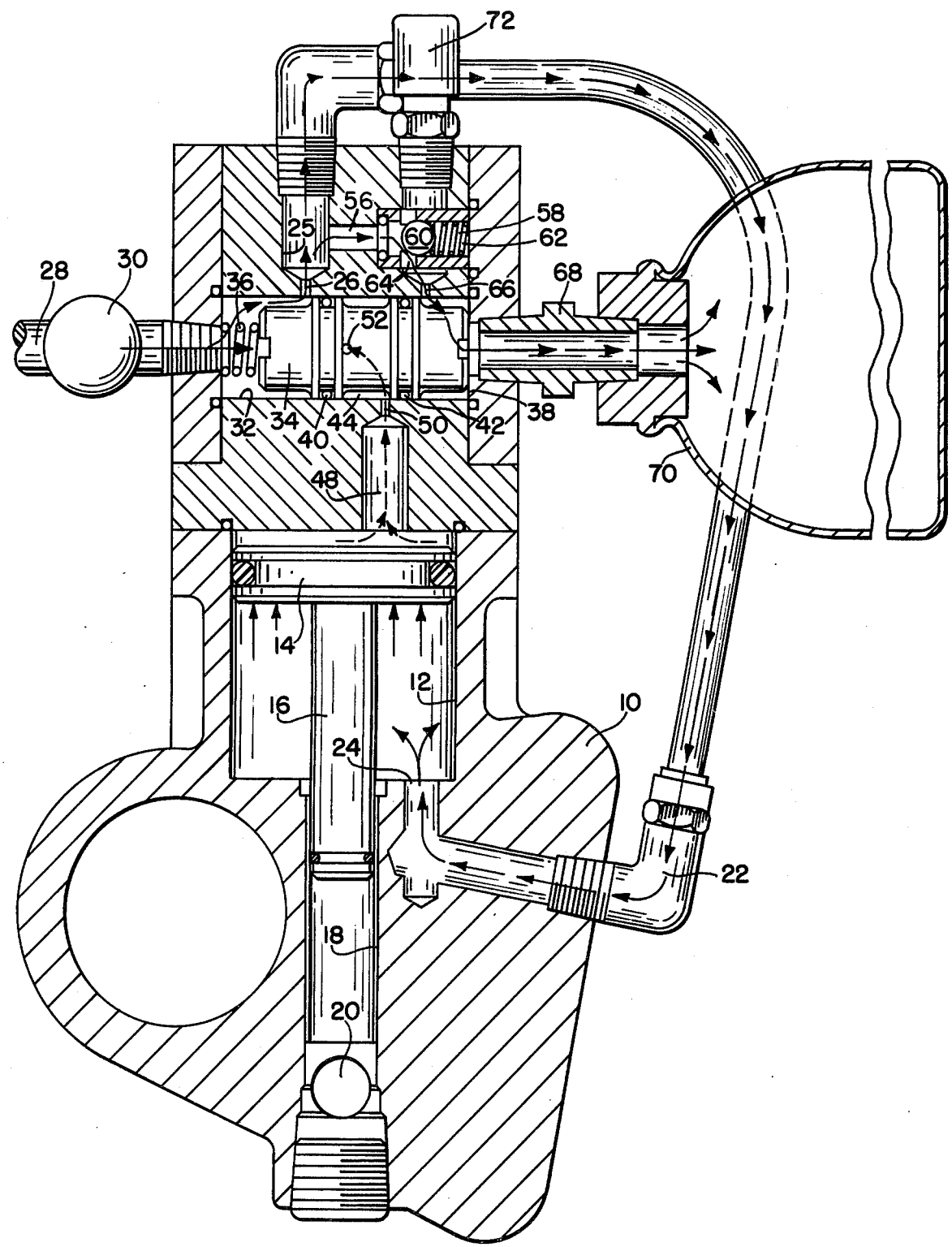
FIG. 1 is a cross sectional view illustrating the intensifier position in retracted condition.

Attention is directed to co-pending application for Disc Brake Caliper, Ser. No. 713,105, filed Oct. 8, 1976, now U.S. Pat. No. 4,074,786 and illustrating a brake to which the intensifier piston of the present case may be connected. Other kinds of brakes and even other mechanical devices may be actuated by the present intensifier piston if desired. The patent application referred to shows and describes a mechanism to which the present invention may be usefully applied.

PREFERRED EMBODIMENT OF THE INVENTION

In the drawings, thin line and arrow A represents exhaust air; while thicker line and arrow B represents air under pressure, e.g. 60-100 PSI.

There is provided a housing 10 in which there is a cylinder 12 for a so-called "intensifier" piston 14. This piston is provided with a piston of lesser diameter 16 operating in a cylinder of lesser diameter 18 for the purpose of applying positive or negative hydraulic pressure with respect to a port 20 which may lead to a mechanical device such as a brake to which it is desired to apply high pressure or negative pressure in order to either operate it or to prevent it from operating.

An air line 22 of any kind can be provided to enter at point 24 into cylinder 12 below the piston 14 it being noted that piston 14 is to be operated upon at one face or the other. The line 22 is derived in the present case from a chamber 25 having a port 26 to which it may be supplied from a main line 28 in which there may be provided a three-way valve 30 if desired. The port 26 leads directly into a cylinder 32 which is provided with a shuttle valve or piston 34 having a spring 36 by which it is normally urged to the right, i.e. to the bottom of the cylinder at 38, FIG. 1.

The piston 34 is provided with two spaced O-rings 40 and 42 leaving a chamber 44 therebetween generally in the center of the shuttle valve piston.

With the piston in the FIG. 1 position, the chamber 48 leads through a port 50 to chamber 44 and to an exhaust port 52 which may lead to the atmosphere.

Another port 56 leads to a cylinder 58 in which there is a ball 60 working against a spring 62 and maintained in the FIG. 1 position by the air pressure to port 56. Thus the ball uncovers a port 64 leading through a port 66 into the chamber 38 at the right hand side of the nearest O ring and which therefore allows air pressure from the main line 28 to enter a fitting 68 to which is secured a sealed tank 70.

With the air pressure on and maintained in line 28, the parts will be in the position shown in FIG. 1. The air tank is under pressure, a positive pressure bears against the under side of intensifier piston 14, and the chamber 18 is under negative pressure. So also is port 20 to the brake or other apparatus not specifically disclosed herein.

Figure 2:
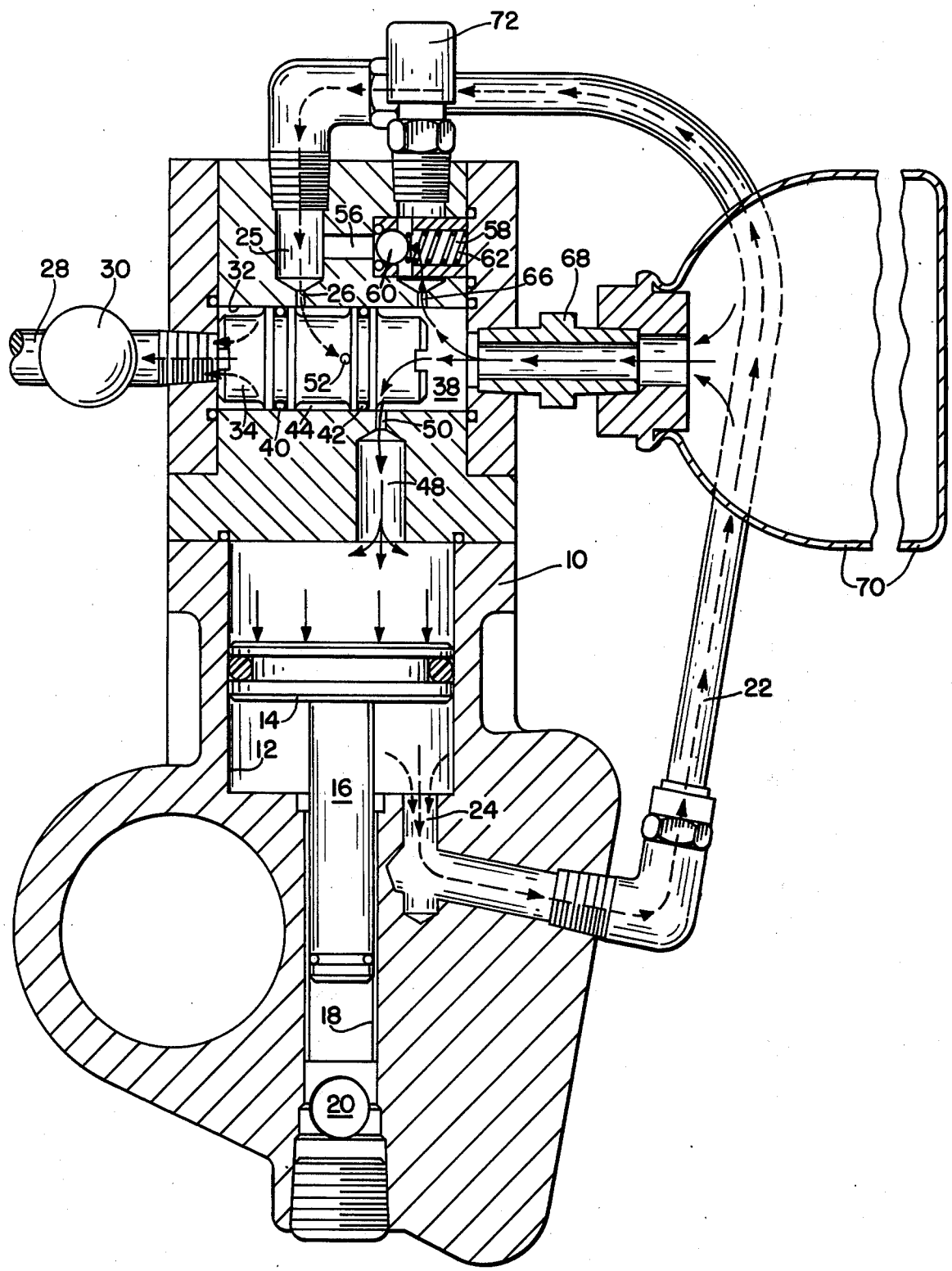
FIG. 2 is a similar view showing the intensifier piston energized.

However, should the air in line 28 fail, or the valve 30 be turned to cut off the air, there is no longer air pressure in line 22, chamber 24, chamber 32, whereupon the pressure in the tank moves the shuttle valve piston immediately against the action of its spring to the left (see FIG. 2), whereupon the air pressure from the tank proceeds reversely to port 66, moving small ball 60 to the left against its O ring seat, so that pressure from the tank cannot be lost through the system, which exhausts the air through the port 52 in chamber 44. The pressure from the tank proceeds through chamber 38, ports 50 and 48 to the top of piston 14 pressing it downwardly, i.e. intensifying the hydraulic pressure in the chamber 18.

Therefore, it will be appreciated that the present invention operates opposite from the usual system where the application of pressure applies the brake and removal of pressure releases the pressure, and it makes no difference whether the air fails in line 28 or whether the valve 30 is shut off, the result is always exactly the same.

A relief valve 72 can be operated to relieve the tank pressure for subsequent brake release if necessary.

I claim:

1. A fail safe apparatus for a pressure operated device comprising a support, a shuttle valve therein, a spring urging the valve in one direction, a source of fluid under pressure assisting the valve spring, a tank, a passage past the valve leading fluid under pressure from the source into the tank, means to close the passage upon failure of the pressure, an intensifier piston structure, a cylinder for the piston, a second passage from said source to one side of the piston holding the same inoperative, said second passage feeding from the valve, said valve being moved by the pressure in the tank to close off the source and the first named passage upon failure of the source, and a third passage leading from the tank to the opposite side of the intensifier piston, said third passage being normally closed by the valve under pressure from the source and being opened by the valve only upon movement of the valve in a reverse direction under influence of the pressure in the tank, whereby the piston intensifies the pressure in the cylinder.

2. The fail safe apparatus of claim 1 including an exterior on and off valve control for the source of fluid.

3. The fail safe apparatus of claim 1 wherein there is a single fluid passage only into the tank.

4. The fail safe apparatus of claim 1 wherein the support is a unit and encases the valve and the intensifier piston and cylinder.

5. A fail safe apparatus for a pressure operated device comprising a support, a shuttle valve therein, a spring urging the valve in one direction, a source of fluid under pressure assisting the valve spring, a tank, a passage past the valve leading fluid under pressure into the tank, means to close the passage upon failure of the pressure, an intensifier piston structure, a second passage from said source thereto holding the same inoperative, said second passage feeding from the valve, said valve being moved by the pressure in the tank to close off the source upon failure of the source, and a third passage leading from the tank to the intensifier piston, said third passage being opened by the valve only upon movement of the valve under influence of the pressure in the tank, wherein the third passage leads to one side only of the intensifier piston and the second passage leads to only the opposite side of the intensifier piston.

* * * * *